(12) United States Patent
Shinke et al.

(10) Patent No.: US 6,194,811 B1
(45) Date of Patent: Feb. 27, 2001

(54) DRIVE APPARATUS

(75) Inventors: Satoshi Shinke; Yasuo Nishihara, both of Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/280,536

(22) Filed: Mar. 30, 1999

(30) Foreign Application Priority Data

Mar. 31, 1998 (JP) .................................................. 10-085843

(51) Int. Cl.[7] ...................................................... H02N 2/00
(52) U.S. Cl. .................................. 310/323.21; 310/323.17
(58) Field of Search ........................ 310/323.01, 323.02, 310/323.17, 323.21, 328

(56) References Cited

U.S. PATENT DOCUMENTS

| 5,589,723 | 12/1996 | Yoshida et al. ...................... 310/328 |
| 5,640,063 | * 6/1997 | Zumeris et al. ...................... 310/328 |
| 5,786,654 | 7/1998 | Yoshida et al. ...................... 310/328 |
| 5,847,488 | * 12/1998 | Yoshida et al. ...................... 310/328 |
| 5,852,336 | * 12/1998 | Takagi ............................ 310/323.18 |
| 5,877,579 | * 3/1999 | Zumeris ......................... 310/323.17 |
| 5,907,212 | * 5/1999 | Okada ................................. 310/328 |
| 5,917,267 | * 6/1999 | Miyazawa et al. .................. 310/317 |
| 5,945,771 | * 8/1999 | Kimura et al. .................. 310/323.05 |
| 6,051,909 | * 4/2000 | Shinke et al. ................... 310/316.01 |

FOREIGN PATENT DOCUMENTS 9-191676    7/1997   (JP) ................................ H02N/2/00

* cited by examiner

*Primary Examiner*—Thomas M. Dougherty
(74) *Attorney, Agent, or Firm*—Burns, Doane, Swecker & Mathis, LLP

(57) ABSTRACT

A drive apparatus having a drive pulse generation device that generates drive pulses. An electromechanical transducer has a first end and a second end. The electromechanical transducer expands and contracts in response to pulses supplied from the drive pulse generation device. A support member is secured to the first end of the electromechanical transducer in the expansion/contraction direction thereof. A first friction member secured to the second end of the electromechanical transducer in the extension/contraction direction thereof. A second friction member frictionally coupled to the first friction member. A load detection device detects the magnitude of a drive load. A drive control device carries out drive control on the basis of the detection results of the load detection device.

28 Claims, 14 Drawing Sheets

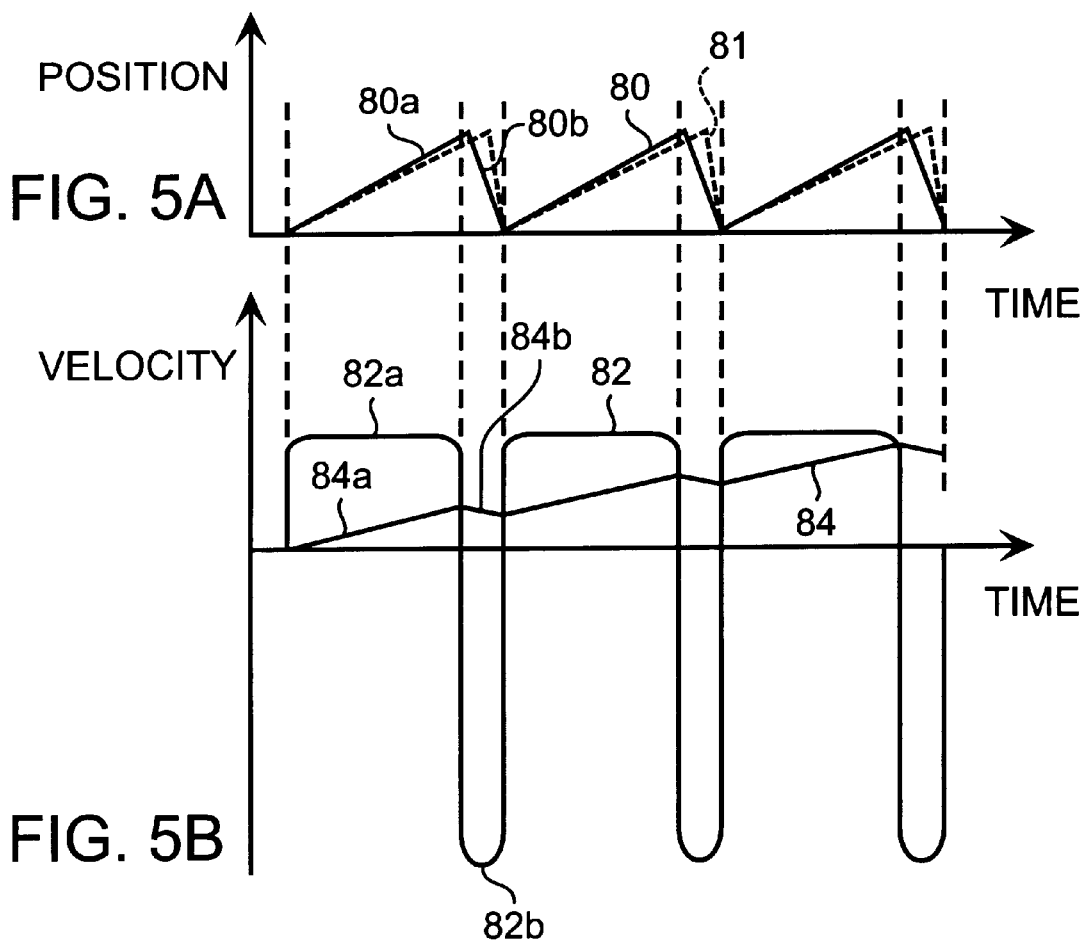
FIG. 5A
FIG. 5B
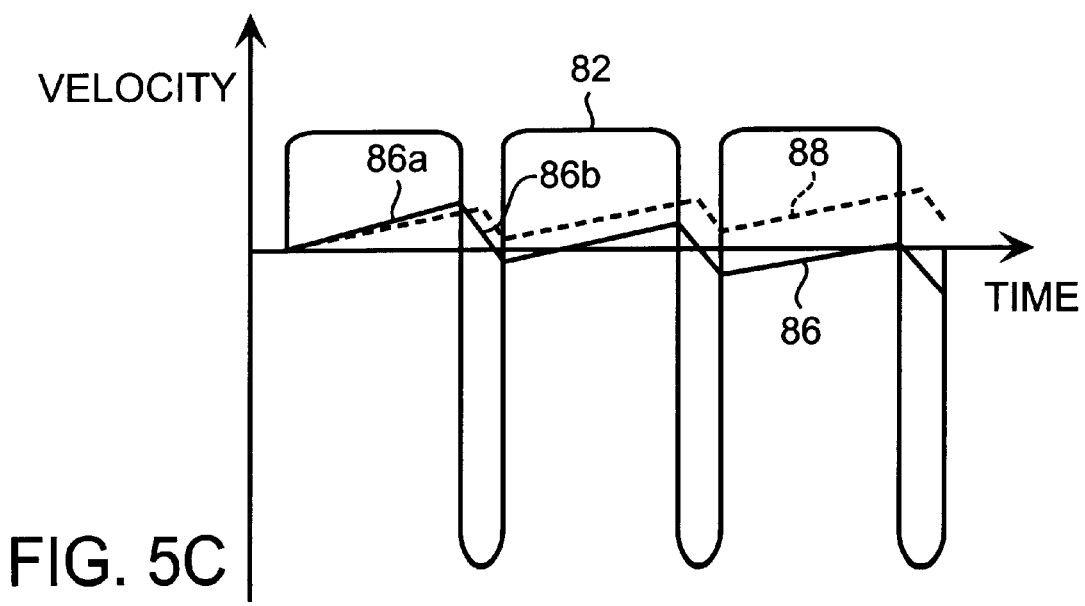
FIG. 5C

DRIVE APPARATUS

This application is based on application No. Hei 10-85843 filed in Japan, the content of which is hereby incorporated by reference.

FIELD OF THE INVENTION

The present invention relates to a drive apparatus. More particularly, the present invention relates to a drive apparatus using an electromechanical transducer, such as a piezoelectric device, and more specifically relates to a drive apparatus using an electromechanical transducer suited for general drive use for precision machines, such as drive portions for XY drive tables, photographing lenses of cameras, projecting lenses of overhead projectors, lenses of binoculars and the like.

DESCRIPTION OF THE RELATED ART

A drive apparatus using an electric motor have been used conventionally to drive XY drive tables, photographing lenses of cameras and the like. However, such drive apparatus are large in size and problematically generate magnetic fields and noise. To solve these various problems, the applicants of the present application have proposed drive apparatuses using electromechanical transducers. U.S. Pat. Nos. 5,589,723 and 5,786,654 are examples of drive apparatus that use electromechanical transducers.

The exploded perspective view shown in FIG. 1 and the assembled perspective view shown in FIG. 2 show an example of a drive apparatus using a piezoelectric device as an electromechanical transducer. This drive apparatus 90 comprises a securing member 24 secured to a base (not shown), a piezoelectric device 22, and a drive shaft 26 supported by the securing member 24 so as to be slidable in the expansion/contraction direction of the piezoelectric device 22. A drive unit 28 is frictionally coupled to the drive shaft 26.

More specifically, one end surface of the piezoelectric device 22 in the extension/contraction direction thereof is secured to the securing member 24, and the other end surface of the piezoelectric device is secured to one end surface of the drive shaft 26. A driven member (not shown), such as a stage on which parts are mounted, is connected to the drive unit 28.

The drive unit 28 comprises a main body 28a, a pad 28b, a leaf spring 28c and screws 28d. A hole is formed in the main body 28a, in which the drive shaft 26 is inserted. Furthermore, a groove is formed at the upper central portion of the main body 28a so that the upper half of the drive shaft 26 inserted in the main body 28a is exposed. The pad 28b is fitted in the groove. The pad 28b is pushed down by the leaf spring 28c secured to the upper surface of the main body 28a with the screws 28d so as to make contact with the drive shaft 26. With this configuration, the drive shaft 26 is frictionally coupled to the drive unit 28. Moreover, a scale 12 is secured to a side surface of the drive unit 28 in the direction of movement thereof. A sensor 14 is secured to the securing member 24 so as to face the scale 12, and is used to detect the position of the drive unit 28.

Next, the operation of the drive apparatus 90 will be described below. When a sawtooth pulse voltage 92 shown in FIG. 3A is applied to the piezoelectric device 22 for example, the drive shaft 26 (in particular, its frictional coupling point to the drive unit 28) is displaced in a triangular shape with respect to the securing member 24 as shown in the model view in FIG. 3B.

In other words, the piezoelectric device 22 extends gradually in the extension/contraction direction thereof at the gradually rising portion 92a of the pulse voltage 92 as shown in FIG. 3A. As indicated by code 94a in FIG. 3B, the drive shaft 26 is gradually displaced in the positive direction (the direction indicated by arrow a in FIGS. 1 and 2) with a slight time delay with respect to the waveform of the pulse voltage 92 because of the effect of the elastic deformation of the drive shaft 26 and the like. At this time, since a friction force is applied to the friction surface of the drive unit 28 making frictional coupling to the drive shaft 26 in the movement direction of the drive shaft 26, the drive unit 28 is moved in the positive direction along the drive shaft 26. When the frequency of the pulse voltage 92 is raised, a relative slip is generated between the drive shaft 26 and the drive unit 28. Even in this case, the drive unit 28 is moved in the positive direction along the drive shaft 26.

Next, the piezoelectric device 22 contracts abruptly in the extension/contraction direction thereof at the abruptly falling portion 92b of the pulse voltage 92 as shown in FIG. 3A. As indicated by code 94b in FIG. 3B, the drive shaft 26 is abruptly displaced in the negative direction (the direction indicated by arrow b in FIGS. 1 and 2) with a slight time delay with respect to the waveform of the pulse voltage 92 because of the effect of the elastic deformation of the drive shaft 26 and the like. At this time, a friction force is applied to the friction surface of the drive unit 28 making frictional coupling to the drive shaft 26 in the movement direction of the drive shaft 26. However, since the application time of the force is short and the inertia force of the drive unit 28 (and the driven member) is present, the drive unit 28 is not moved at all or is hardly moved, and only the drive shaft 26 is moved. In other words, a relative slip is generated between the drive shaft 26 and the drive unit 28, and the drive shaft 26 returns to its original position. However, the drive unit 28 is hardly moved. Therefore, the drive unit 28 is moved in the positive direction a when the drive shaft 26 is displaced gradually as a whole. This occurs when a pulse voltage comprising a gradually rising portion and an abruptly falling portion is supplied to the piezoelectric device 22.

On the other hand, a pulse voltage comprising an abruptly rising portion and a gradually falling portion is supplied to the piezoelectric device 22 to drive the drive unit 28 in the negative direction b.

Furthermore, in the drive apparatus 90, the sensor 14 detects the position of the drive unit 28, and this detection is used for feedback control in order to move the drive unit 28 to its target position.

Generally, the drive speed of the drive unit 28 is roughly proportional to the movement speed of the drive shaft 26 in the direction wherein the drive unit 26 is moved gradually. Therefore, as indicated by codes 96 to 98 in FIG. 3C for example, the movement speed of the drive shaft 26 is changed by changing the voltage amplitude H (see FIG. 3A) of the pulse voltage 92, thereby to control the drive speed of the drive unit 28. In order to raise the drive speed of the drive unit 28 for example, the voltage amplitude H of the pulse voltage 92 is increased.

As described above, in the conventional drive apparatus 90, the speed of the drive unit 28 has been controlled by changing the voltage amplitude H of the above-mentioned pulse voltage 92.

However, if a drive load changes, optimal drive control cannot be attained by the above-mentioned method and apparatus.

SUMMARY OF THE INVENTION

An object of the present invention is to provide a drive apparatus using an electromechanical transducer usable for drive control depending on a change in drive load.

In order to solve the above-mentioned problem, the drive apparatus using an electromechanical transducer in accordance with the present invention comprises a drive pulse generation device for generating pulses, an electromechanical transducer which is connected to the drive pulse generation device and extends or contracts depending on the pulses supplied from the drive pulse generation device, a support member secured to one end of the electromechanical transducer in the extension/contraction direction thereof, a first friction member secured to the other end of the electromechanical transducer in the extension/contraction direction thereof, and a second friction member frictionally coupled to the first friction member. This drive apparatus further comprises a load detection device for detecting the magnitude of a drive load, and a drive control device for carrying out drive control on the basis of the detection results of the load detection device.

In the above-mentioned configuration, one of the support member and the second friction member is secured, and the other is coupled to a movable unit in order to drive the movable unit. The electromechanical transducer is a device used to convert electrical energy (voltage, current, electric field, charge, static electricity, magnetic field and the like, for example) into mechanical energy (deformation and strain, such as extension/contraction, expansion, bending, torsion). An electrostatic actuator, a piezoelectric device, an electric strain device, a magnetic strain device and the like are each categorized as an electromechanical transducer.

Preferably, the drive control device includes a gradual/abrupt displacement generation device for generating a gradual displacement and an abrupt displacement in a single drive period, that is, relative displacements between the support member and the second friction member. This gradual/abrupt displacement generation device is used to change the ratio between a time during which a gradual displacement is performed and a time during which an abrupt displacement is performed in the single drive period.

Preferably, the gradual/abrupt displacement generation device operates so that the ratio of the time during which the gradual displacement is performed to the time during which the abrupt displacement is performed is made larger in the single drive period, as the drive displacement detected by the load detection device increases.

Preferably, the single drive period corresponds to the period of a single drive pulse to be output from the drive pulse generation device. The single drive pulse to be output from the drive pulse generation device comprises a first waveform for supplying the gradual displacement to the electromechanical transducer and a second waveform for supplying the abrupt displacement thereto. The gradual/abrupt displacement generation device changes the ratio between the time during which the first waveform is used for operation and the time during which the second waveform is used for operation in the period of the single drive pulse, thereby to change the ratio between the time during which the gradual replacement is performed and the time during which the abrupt displacement is performed at the friction coupling portion.

Preferably, the pulse waveform changing device operates so that the ratio of the time during which the first waveform is used for operation to the time during which the second waveform is used for operation is made larger in the period of the single drive pulse, as the drive load detected by the load detection device increases, whereby the ratio of the time during which the gradual displacement is performed to the time during which the abrupt displacement is performed is made larger.

Preferably, the drive apparatus further comprises a friction force changing device for changing the friction force generated between the first friction member and the second friction member frictionally coupled to each other.

The friction force changing device increases the friction force generated between the first friction member and the second friction member frictionally coupled to each other, as the drive load detected by the load detection device increases.

Furthermore, the electromechanical transducer is a piezoelectric device. In the load detection device, the piezoelectric device is also used as a pressure sensor for detecting the magnitude of the drive load.

Moreover, when the mass of a driven object is unchanged, but when the drive load is changed depending on its attitude, an attitude sensor may be used to detect the magnitude of the drive load.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 5A, 5B and 5C are graphs illustrating the drive method for the drive apparatus in accordance with one embodiment of the present invention;

DESCRIPTION OF THE PREFERRED EMBODIMENTS

Drive apparatuses using an electromechanical transducer in accordance with embodiments of the present invention will be described below in detail referring to the accompanying drawings. Since each embodiment is configured basically similar to the drive apparatus 90 described as the above-mentioned conventional example, differences therebetween will be mainly described below. The entire disclosures of U.S. Pat. Nos. 5,589,723 and 5,786,654 are hereby incorporated by reference. The following same codes are used to designate the same components.

First, a drive apparatus 1 in accordance with a first embodiment will be described below referring to FIGS. 4 to 7.

Figure 1:
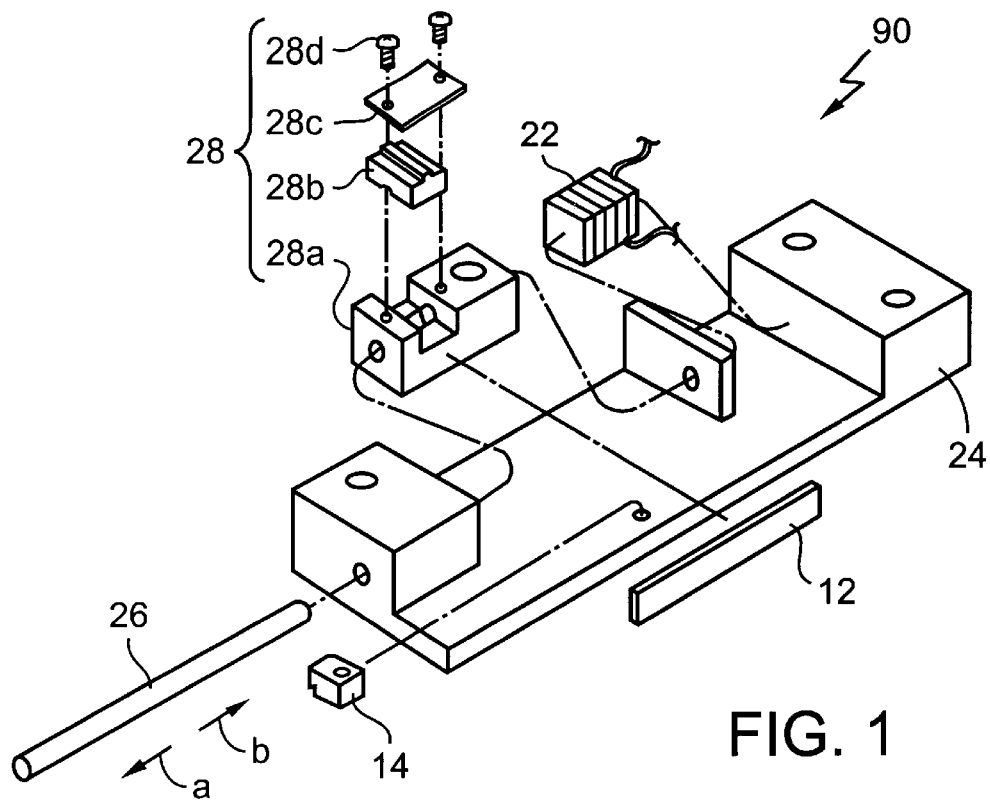
FIG. 1 is an exploded perspective view showing a conventional drive apparatus using a piezoelectric device.
Figure 2:
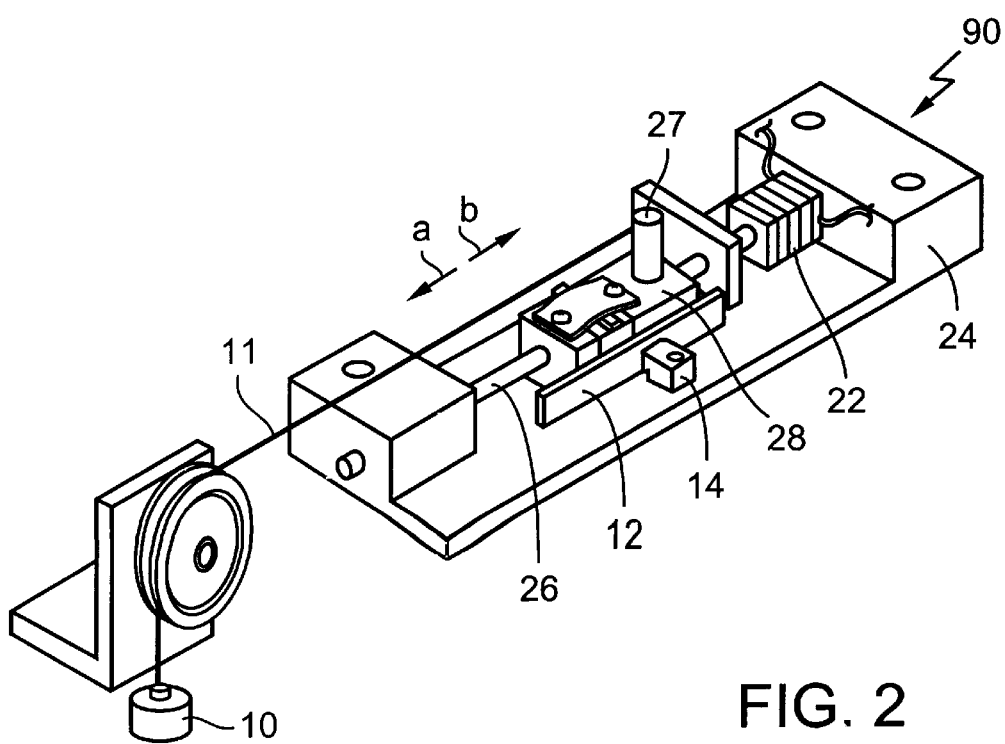
FIG. 2 is an overall perspective view showing the conventional drive apparatus using the piezoelectric device.
Figure 7:
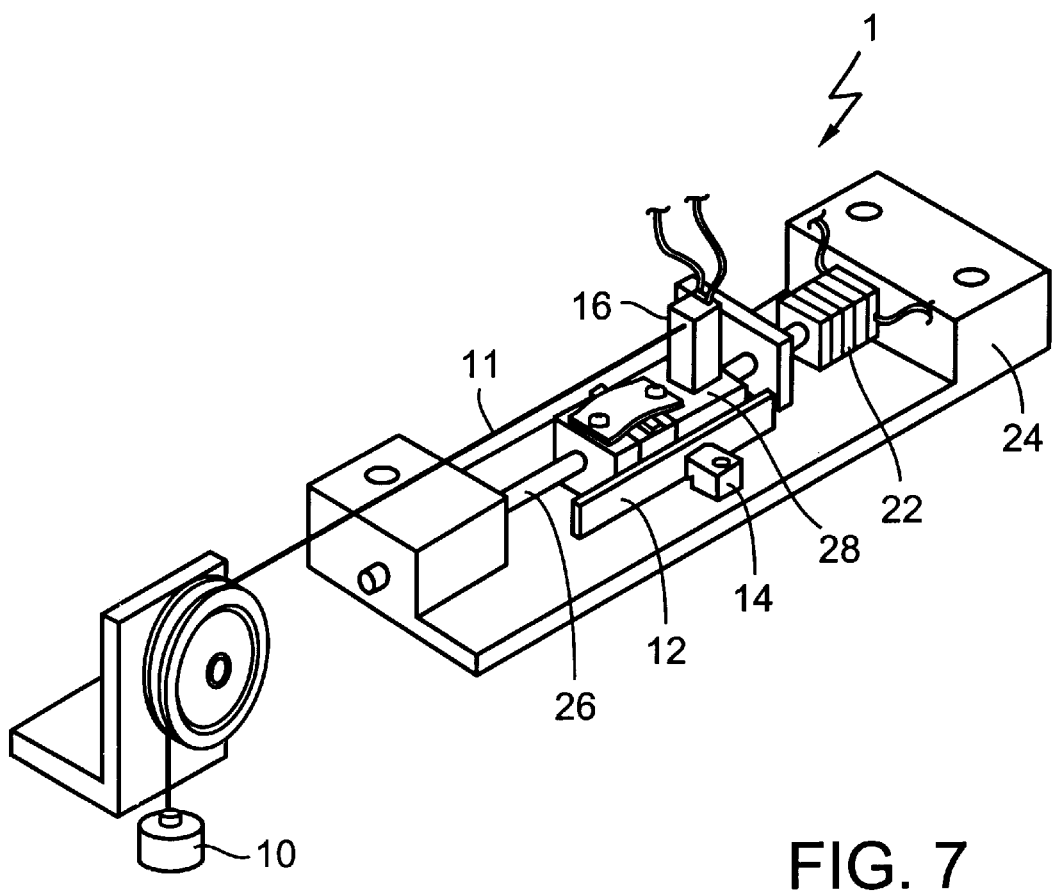
FIG. 7 is a perspective view showing a drive apparatus in accordance with the first embodiment of the present invention.

FIG. 7 is an assembled perspective view showing the drive apparatus in accordance with the first embodiment of the present invention. The drive apparatus 1 is generally configured in a way similar to the drive apparatus 90 described as the conventional example and generally shown in FIGS. 1 and 2. In other words, the drive apparatus 1 comprises a securing member 24 secured to a base (not shown), a piezoelectric device 22, a drive shaft 26 slidably supported by the securing member 24, and a drive unit 28 connected to a driven member (not shown), such as a stage or the like on which parts are mounted. One end surface of the piezoelectric device 22 in the extension/contraction direction thereof is secured to the securing member 24 (a support member), and the other end surface in the extension/contraction direction thereof is securely connected to one end surface of the drive shaft 26 (a first friction member). The drive shaft 26 is inserted in the drive unit 28 (a second friction member) so that they are frictionally coupled to each other. A scale 12 formed of a magnetization rod is secured to the drive unit 28, and a sensor 14 formed of a magneto-resistance is secured to the securing member 24 so as to face the scale 12, and is used to detect the position of the drive unit 28.

Furthermore, the drive apparatus 1 has a sensor 16 used as a load sensor for detecting a pressure. This sensor 16 detects the magnitude of a drive load W caused by a driven object 10. In other words, one end of a wire 11 is secured to the pressure detection portion of the sensor 16, and the driven object 10 is secured to the other end of the wire 11. The drive apparatus 1 feeds back outputs from the sensors 14 and 16 so that the waveform of a pulse voltage to be applied to the piezoelectric device 22 becomes an optimal waveform, thereby to carry out drive highly accurately and efficiently. This feedback will be described later in detail.

In some circumstances, the drive speed and positioning accuracy of the drive apparatus 1 are not required to be relatively high. In this case, control circuitry and the position sensor 14, which is required to be mounted highly accurately and causes the size of the control portion to become relatively large, may be omitted, and a simple method using a microswitch, a photo-interrupter or the like is used for positional detection. With this configuration, a pulse voltage having an optimal waveform is output on the basis of only the measured value of the sensor 16, so as to simplify the control portion.

The drive apparatus 1 adjusts the pulse voltage applied to the piezoelectric device 22 depending on the magnitude of the drive load W detected by the pressure sensor 16, and changes a displacement at the frictional coupling point between the drive shaft 26 and the drive unit 28, i.e., a displacement pulse, depending on the magnitude of the drive load W. Because of the effect of the elasticity and the like of the piezoelectric device 22 and the drive shaft 26, the phase of the waveform of the displacement pulse at the frictional coupling point is delayed with respect to the phase of the waveform of the pulse voltage to be applied, and these waveforms are not the same, although they are similar to each other.

Figure 4:
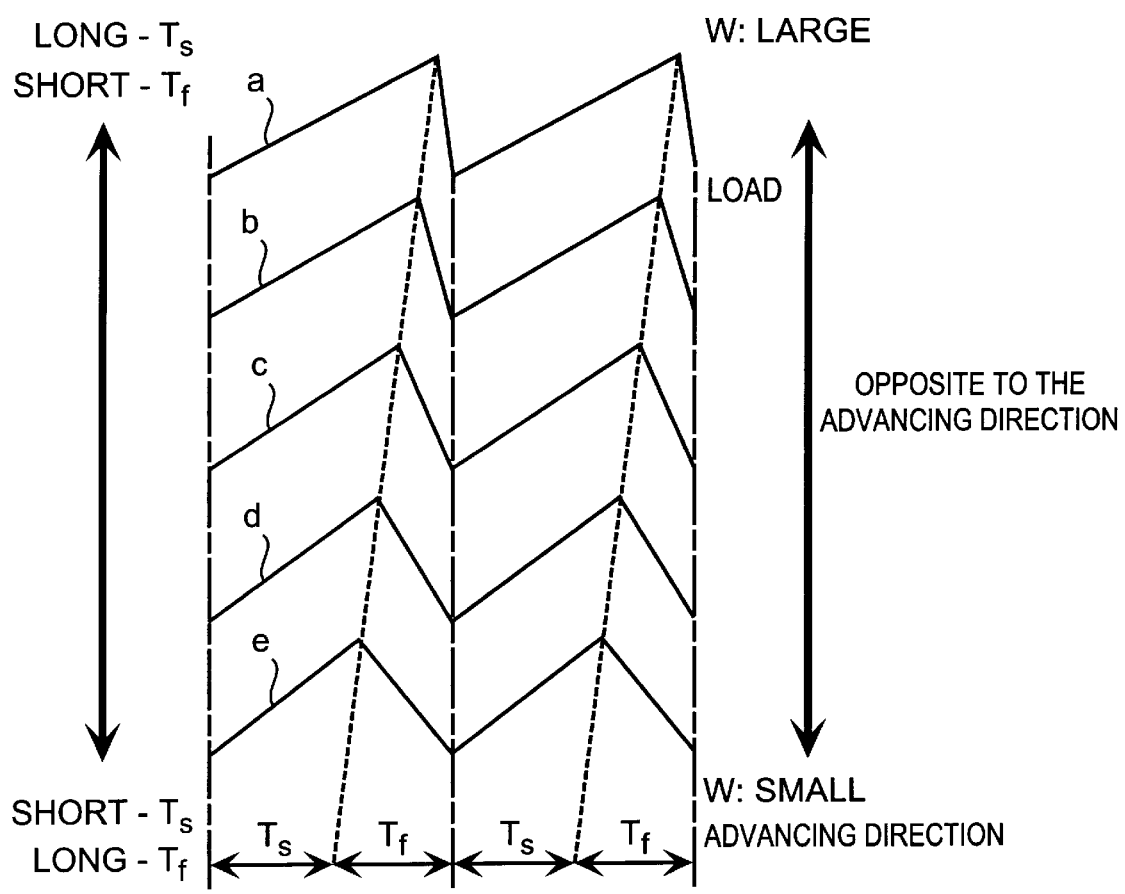
FIG. 4 is a graph showing displacements in a drive apparatus in accordance with one embodiment of the present invention.

As shown in FIG. 4, a view showing waveforms, drive or displacement pulses a to e have triangular waveforms, wherein a change in displacement is relatively gradual during a gradual displacement time Ts and generally abrupt during an abrupt displacement time Tf, while the frequency and amplitude are constant. In the displacement pulses a to e, the larger the drive load W (the larger the absolute value of the drive load in the direction opposite to the advancing direction, or the smaller the absolute value of the drive load in the advancing direction), the longer the gradual displacement time Ts and the shorter the abrupt displacement time Tf. Conversely, the smaller the drive load W (the smaller the absolute value of the drive load in the direction opposite to the advancing direction, or the larger the absolute value of the drive load in the advancing direction), the shorter the gradual displacement time Ts and the longer the abrupt displacement time Tf. The reason will be described below referring to FIGS. 5A to 5C, wherein graphs illustrate embodiments of waveforms of pulse voltages and drive pulses.

When the frictional coupling point between the drive shaft 26 and the drive unit 28 repeatedly undergoes displacement according to a triangular waveform having a gradual expansion or extension (code 80a) and an abrupt contraction (code 80b) as indicated by a solid line designated by code 80 in FIG. 5A, the movement speed of the drive shaft 26 becomes a positive speed (code 82a) during the extension period, and becomes a negative speed (code 82b) during the contraction period as shown by solid lines designated by code 82 in FIGS. 5B and 5C. Herein, the extension direction of the piezoelectric device 22 is defined as the positive direction, and designated as the desired advancing direction of the drive unit 28.

The drive unit 28 is driven by receiving the friction force exerted between the drive unit 28 and the drive shaft 26. First, a condition wherein no drive load is applied to the drive unit 28 will be described below. In the case when a slip occurs between the drive unit 28 and the drive shaft 26 during both the extension and contraction periods of the piezoelectric device 22, a constant kinematic friction force ±F (F>0), changing in direction, is applied to the drive unit 28. When it is assumed that the mass of the drive unit 28 is M and that the acceleration thereof is a, the equation of motion for the drive unit 28 is represented by $\pm F = M \cdot a$, and the acceleration of the drive unit 28 is represented by $a = \pm F/M$; the absolute value of the acceleration is constant. Therefore, the speed of the drive unit 28 is indicated by the solid line designated by code 84 in FIG. 5B. In other words, the drive unit 28 is accelerated (code 84*a*) or decelerated (code 84*b*) at an inclination having a constant absolute value, and the time for the acceleration is longer than the time for the deceleration. As a result, the drive unit 28 is driven while its speed is increased gradually in the positive direction in a zigzag form. In the end, or after a series of displacement pluses, the speed of the drive unit 28 becomes nearly equal to the speed (code 82*a*) of the drive shaft 26 in the positive direction thereof. In this way, when no drive load is applied, the advancing direction and the finally achieved speed of the drive unit 28 are determined by the ratio between the gradual displacement time Ts and the abrupt displacement time Tf of the drive shaft 26.

Next, a condition wherein a drive load W is applied to the drive unit 28 will be described. When it is assumed that a drive load −W (F>W>0) is applied to the drive unit 28 in a direction opposite to the desired advancing direction, i.e., the negative direction, the equation of motion for the drive unit 28 is represented by $\pm F - W = M \cdot a$. Therefore, the acceleration of the drive unit 28 is represented by $a = (F-W)/M$ during the extension period of the piezoelectric device 22, and represented by $a = -(F+W)/M$ during the contraction period thereof. Regarding the speed of the drive unit 28, the absolute value of the inclination during the acceleration time (code 86*a*) is different from the absolute value of the inclination during the deceleration time (code 86*b*), as indicated by the solid line designated by code 86 in FIG. 5C, for example. Therefore, the drive unit 28 is gradually accelerated in the direction opposite to the desired advancing direction, i.e., the negative direction.

Accordingly, the drive apparatus 1 of the present invention controls the displacement of the drive unit 28 as indicated by the broken line 81 in FIG. 5A. In other words, the extension time in each pulse waveform is prolonged while the period and amplitude of the displacement pulse are maintained constant, and the contraction time is shortened in order to change the ratio between the displacement time in the extension direction and the displacement time in the contraction direction. As a result, as indicated by the broken line designated by code 88 in FIG. 5C, the acceleration time of the drive unit 28 in the positive direction is prolonged, and the deceleration time in the negative direction is shortened, whereby the drive unit 28 is accelerated in the positive direction as a whole, as opposed to being accelerated in the negative direction (code 86). In this way, when a drive load is applied to the drive unit 28 in the direction opposite to the desired advancing direction, the drive unit can be driven in the desired advancing direction by increasing the ratio of the time for driving the drive unit 28 in the advancing direction in accordance with the increase in the drive load.

When a drive load is applied in a direction of preventing a movable unit from advancing, the load is applied in the minus direction (the drive speed is lowered) as indicating by the solid line designated by code 86 in FIG. 5C. However, when the drive load is applied in the advancing direction of the movable unit, the inclination in the minus direction in FIG. 5C becomes the inclination of the advancing direction (plus direction), and high-speed drive can be carried out. When the drive load is applied in the advancing direction and drive is desired to be carried out at the same speed as that obtained in no load condition, the waveform shown at the lower portion of FIG. 4 is used.

In other words, when the drive frequency and drive amplitude are constant, the advancing direction and movement speed of the drive unit 28 can be changed by changing the ratio between the extension time and the contraction time for displacement pulses 80 and 81, that is, by moving the position of the apex of the triangular shape comprising the displacement pulses 80 and 81 in parallel with the base of the triangle. As a result, by adjusting the waveforms of the displacement pulses as described above, it is possible to attain proper drive depending on a drive load.

Figure 16A:
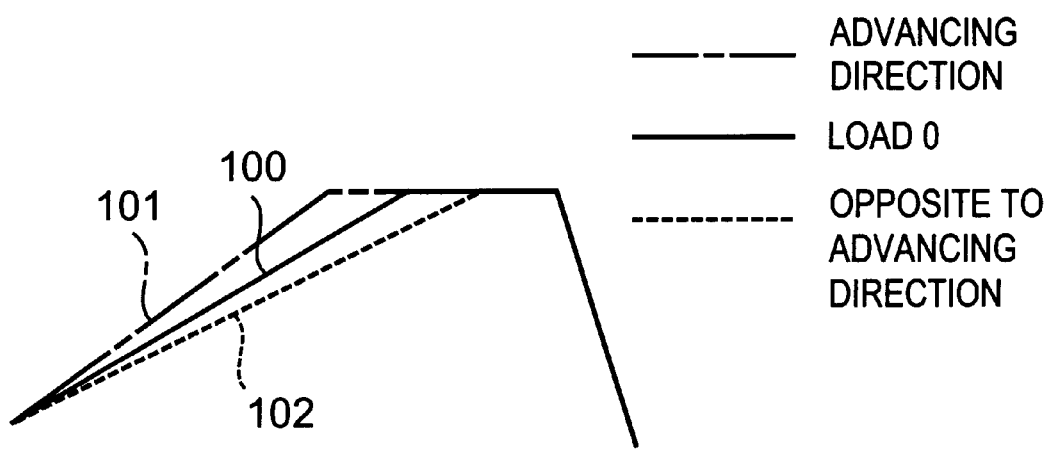
FIGS. 16A, 16B and 16C are graphs showing the waveforms of pulse voltages in accordance with one embodiment of the present invention.
Figure 16B:
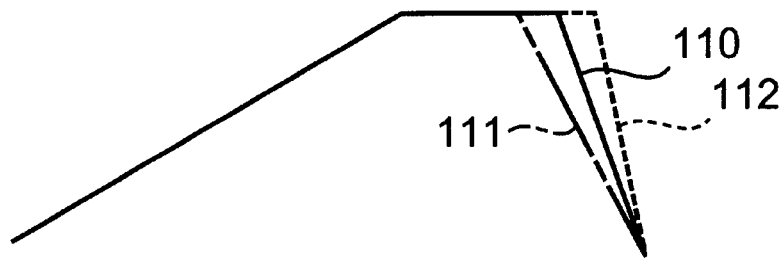
Figure 16C:
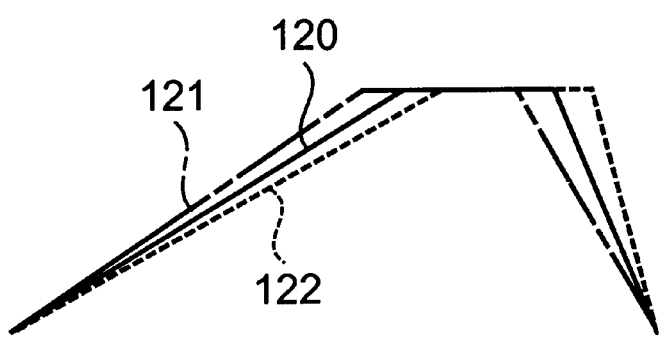

FIGS. 16A, 16B and 16C show the waveforms of pulse voltages supplied to the piezoelectric device 22, which are used to adjust the waveforms of the displacement pulses. The solid line indicates a waveform when no load is applied; the broken line indicates a waveform when a drive load is applied in the direction opposite to the advancing direction; and the chain line indicates a waveform when a drive load is applied in the advancing direction. In the waveform shown in FIG. 16A, only the inclination of the first waveform at the rising portion of the trapezoidal waveform of a pulse voltage is changed as indicated by codes 100 to 102, depending on a change in drive load. Hence, the inclination of the second waveform at the falling portion of the trapezoidal waveform of the pulse voltage is constant. In the waveform shown in FIG. 16B, the inclination of the first waveform of the pulse voltage is constant, and only the inclination of the second waveform is changed as indicated by codes 110 to 112. In the waveform shown in FIG. 16C, both the rising and falling portions of the pulse voltage are changed as indicated by codes 120 to 122.

Furthermore, a transfer function G2 (see FIG. 6) described later may be changed while the pulse voltage remains constant.

In the above explanation referring to FIG. 4, displacements depending on drive loads are indicated when a movable unit is moved in the same period and at the same amplitude so that the changing condition of the ratio between the gradual displacement time Ts and the rapid displacement time Tf at the frictional coupling point can easily be grasped. However, in the present invention, it is not necessarily required that the frictional coupling point is moved in the same period and at the same amplitude. Although drive waveforms (having the same period and the same voltage) corresponding to the same period and the same displacement and shown in FIG. 4 are applied in the above explanation referring to FIG. 16, drive waveforms not having the same period and the same voltage may be applied as necessary.

Figure 6:
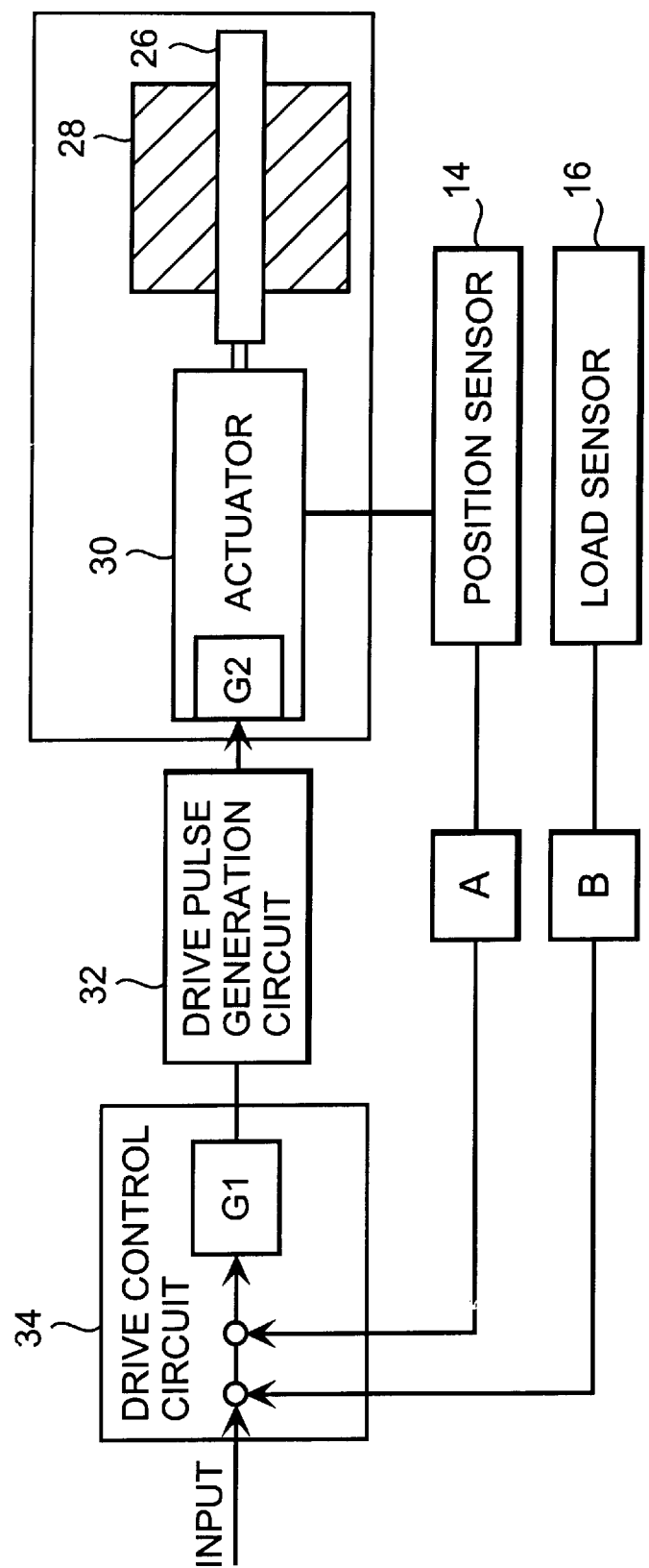
FIG. 6 is a block diagram showing the drive apparatus in accordance with a first embodiment of the present invention.

FIG. 6 is a block diagram showing the first embodiment of the present invention. The drive apparatus 1 is provided with a position sensor 14 and a load sensor 16. The drive apparatus 1 further includes a drive control circuit 34, a drive pulse generation circuit 32, and an actuator 30 (a portion comprising a piezoelectric device 22, a securing member 24, a drive shaft 26 and a drive unit 28). The signals of the position sensor 14 and the load sensor 16 are fed back in order to optimally control the waveforms of drive pulses.

By using an input signal for a target speed (command value G1) and the signals fed back from the position sensor 14 and the load sensor 16, the drive control circuit 34 outputs a the command value G1 for determining a drive waveform to be output to the actuator 30. At this time, the drive control circuit 34 determines G1 in consideration of the effect of G2. Herein, G2 designates a transfer function determined by physical properties, such as the coefficient of elasticity, of the components of the actuator 30, such as the drive shaft 26 and the drive unit 28.

Figure 3A:
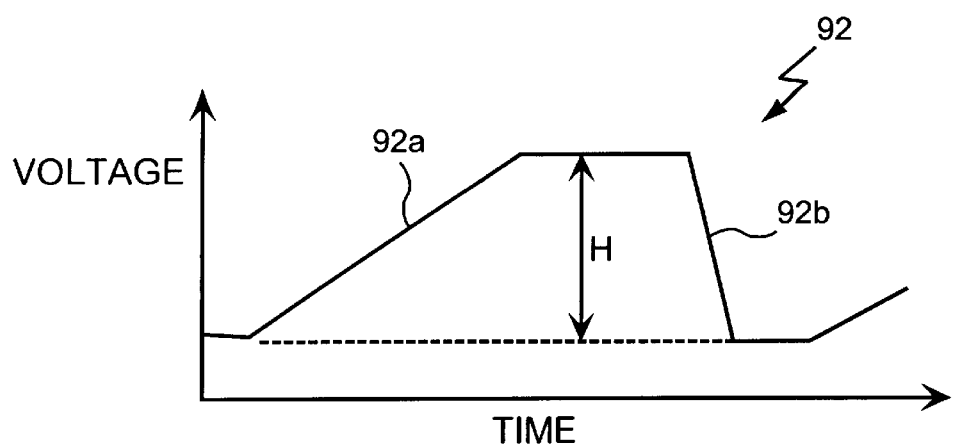
FIG. 3A is a graph showing the waveform of a drive pulse supplied to the piezoelectric device of the conventional drive apparatus.
Figure 3B:
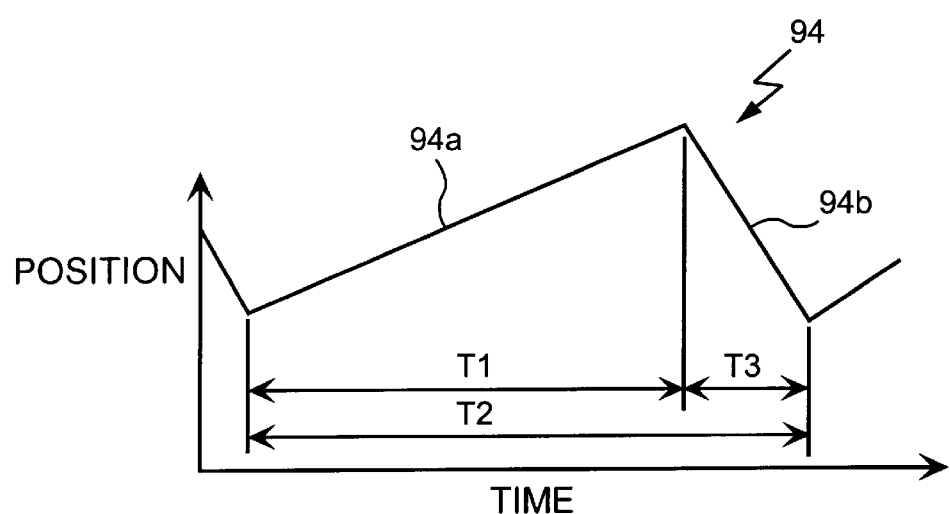
FIG. 3B is a graph showing a displacement generated when the drive pulse shown in FIG. 3A is supplied.
Figure 3C:
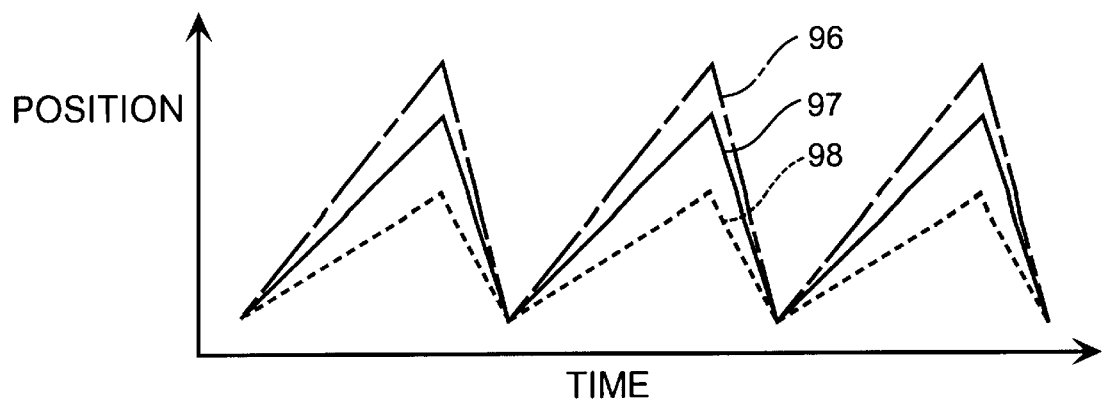
FIG. 3C is a graph showing a displacement depending on a change in supplied voltage.

In other words, the waveform of the pulse voltage to be input to the actuator 30 has a nearly trapezoidal shape as shown in FIG. 3A. Due to the effect of the transfer function G2, the displacement amount of the frictional coupling point between the drive shaft 26 and the drive unit 28 forms a nearly triangular shape as shown in FIG. 3B. Therefore, the drive control circuit 34 determines G1 by considering the displacement amount of the frictional coupling point between the drive unit 28 and the drive shaft 26 to be driven actually, that is, the effect of G2.

After receiving G1, the drive pulse generation circuit 32 generates a pulse voltage having an optimal waveform to be applied to the actuator 30. The drive pulse generation circuit 32 controls the time for charging/discharging by carrying out known pulse width modulation control or the like depending on the value of G1 in order to generate a pulse voltage having a desired waveform.

Next, a second embodiment will be described below referring to FIGS. 8 to 12.

Figure 8:
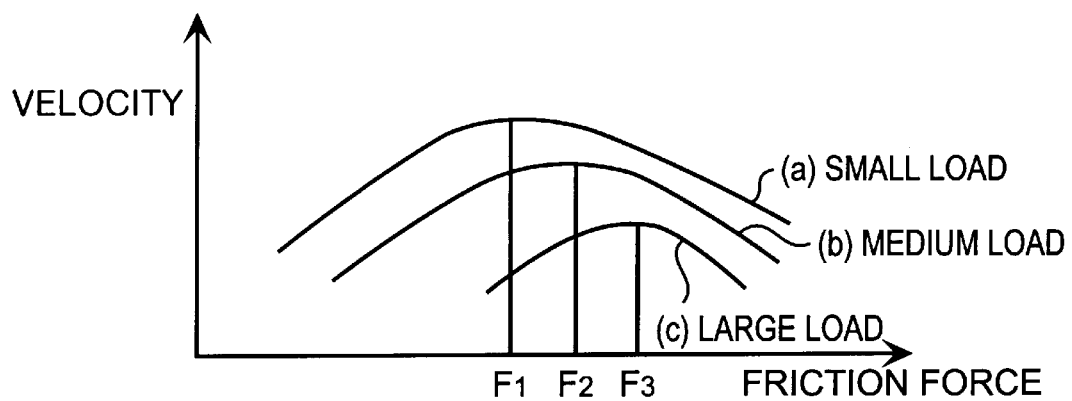
FIG. 8 is a graph showing a relationship between a friction force and a drive speed.

In the conventional drive apparatus 90, when a pulse voltage having a constant frequency is applied to the piezoelectric device 22, a relationship shown in FIG. 8 is obtained between the drive speed of the drive unit 28 and the friction force exerted between the drive unit 28 and the drive shaft 26. As illustrated in FIG. 8, the maximum friction force F1, F2 or F3 differs depending on the magnitude of a drive load. In consideration of this, a drive apparatus 2 in accordance with the second embodiment is additionally provided with a device for changing the friction force. Except for this device, the drive apparatus 2 is the same as the drive apparatus 1 in accordance with the first embodiment.

In other words, the configuration of a drive unit 38 differs from that of the drive unit 28 in accordance with the first embodiment. The drive unit 38 adjusts the force that holds the drive shaft 26 to thereby adjust the friction force between the drive unit 38 and the drive shaft 26.

Figure 9A:
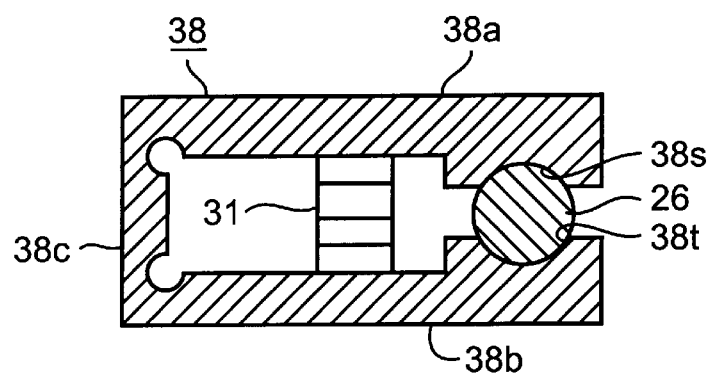
FIGS. 9A and 9B are sectional views showing major portions of a drive apparatus in accordance with a second embodiment of the present invention.
Figure 9B:
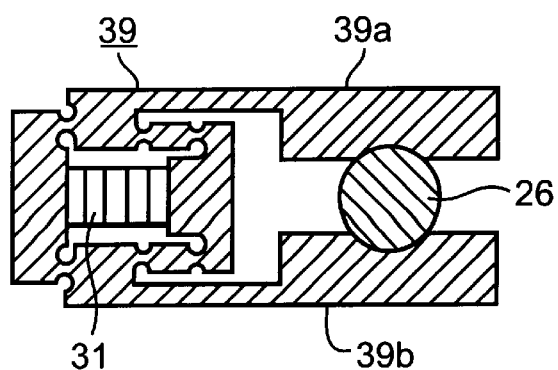

As shown in FIG. 9A, a sectional view of the drive unit 38 taken on a plane perpendicular to the axis of the drive shaft 26, two holding pieces 38a and 38b are connected to each other at a hinge portion 38c. Friction coupling surfaces 38s and 38t for holding the drive shaft 26 are provided on the opening end sides of the holding pieces 38a and 38b, and the central portions of the two holding pieces 38a and 38b are connected to each other via a piezoelectric device 31. When the piezoelectric device 31 extends, the space between the opening ends of the holding pieces 38a and 38b is changed by the elastic deformation of the hinge portion 38c and its peripheral portions, and the force for holding the drive shaft 26 at the friction coupling surfaces 38s and 38t of the holding pieces 38a and 38b is changed, whereby the friction force between the drive shaft 26 and the drive unit 38 is changed. The piezoelectric device 31 is disposed so that its extension/contraction direction becomes a direction along the space between the two holding pieces 38a and 38b. That is, the axis along which the piezoelectric device expands and contracts is generally perpendicular to the longitudinal axis of the shaft 26. However, as shown by the drive unit 39 shown in FIG. 9B, the extension/contraction direction of the piezoelectric device 31 can also be perpendicular to the direction along the space between the two holding pieces 38a and 38b.

Figure 10:
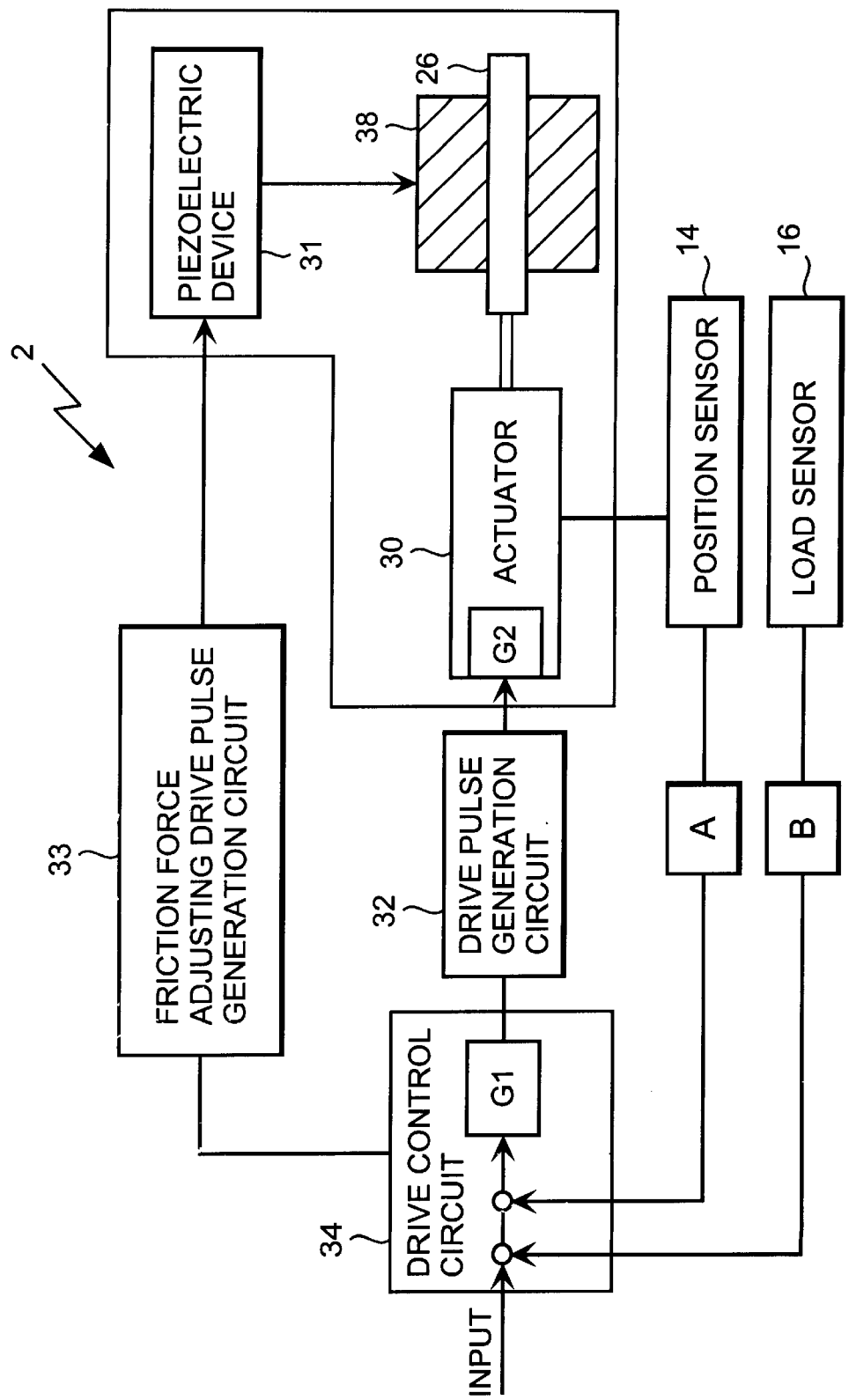
FIG. 10 is a block diagram showing the drive apparatus in accordance with the second embodiment of the present invention.
Figure 11:
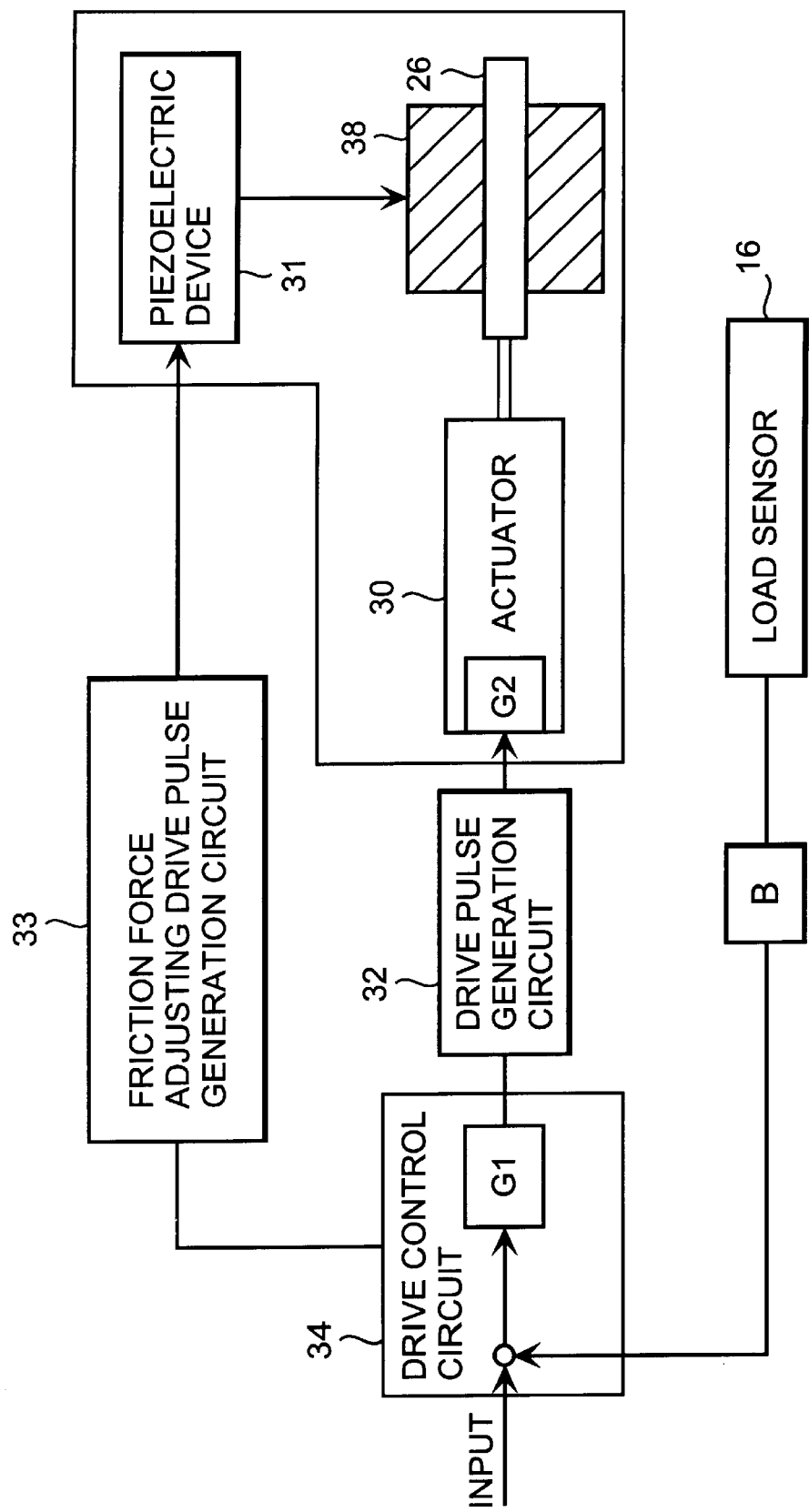
FIG. 11 is a block diagram showing a drive apparatus in accordance with a modified embodiment of the present invention.

FIG. 10 is a block diagram showing the second embodiment of the present invention. The drive apparatus 2 is provided with a position sensor 14 and a load sensor 16 just as the drive apparatus 1 in accordance with the first embodiment.

In other words, the drive apparatus 2 comprises a drive control circuit 34, a drive pulse generation circuit 32, a friction-force adjusting drive pulse generation circuit 33, an actuator 30 (a portion comprising a piezoelectric device 22, a securing member 24, a drive shaft 26 and a drive unit 38), a position sensor 14 and a load sensor 16. The signals of the position sensor 14 and the load sensor 16 are fed back in order to optimally control the waveforms of drive pulses and a friction force.

By using an input signal for a target speed (command value G1) and the signals fed back from the position sensor 14 and the load sensor 16, the drive control circuit 34 outputs the command value G1 for determining a drive waveform to be output to the actuator 30. At this time, the drive control circuit 34 determines G1 in consideration of the effect of G2. Herein, G2 designates a transfer function determined by physical properties, such as the coefficient of elasticity, of the components of the actuator 30, such as the drive shaft 26 and the drive unit 38.

In other words, as described above, the waveform of the pulse voltage to be input to the actuator 30 has a nearly trapezoidal shape as shown in FIG. 3A. Due to the effect of the transfer function G2, the displacement amount of the frictional coupling point between the drive shaft 26 and the drive unit 38 forms a nearly triangular shape as shown in FIG. 3B. Therefore, the drive control circuit 34 determines G1 by considering the displacement amount of the frictional coupling point between the drive unit 38 and the drive shaft 26 to be driven actually, that is, the effect of G2.

After receiving G1, the drive pulse generation circuit 32 generates a pulse voltage having an optimal waveform to be applied to the actuator 30. The drive pulse generation circuit 32 controls the time for charging/discharging by carrying out known pulse width modulation control or the like depending on the value of G1 in order to generate a pulse voltage having a desired waveform.

The friction-force adjusting drive pulse generation circuit 33 generates a pulse voltage having an appropriate waveform to be applied to the piezoelectric device 31 in order to adjust the friction force between the drive shaft 26 and the drive unit 38 depending on the magnitude of the drive load detected by the load sensor 16. On the basis of the accurately detected drive load, the drive control circuit 34 controls the friction-force adjusting drive pulse generation circuit 33 so as to increase the friction force when the drive load is larger than its reference value.

Figure 12:
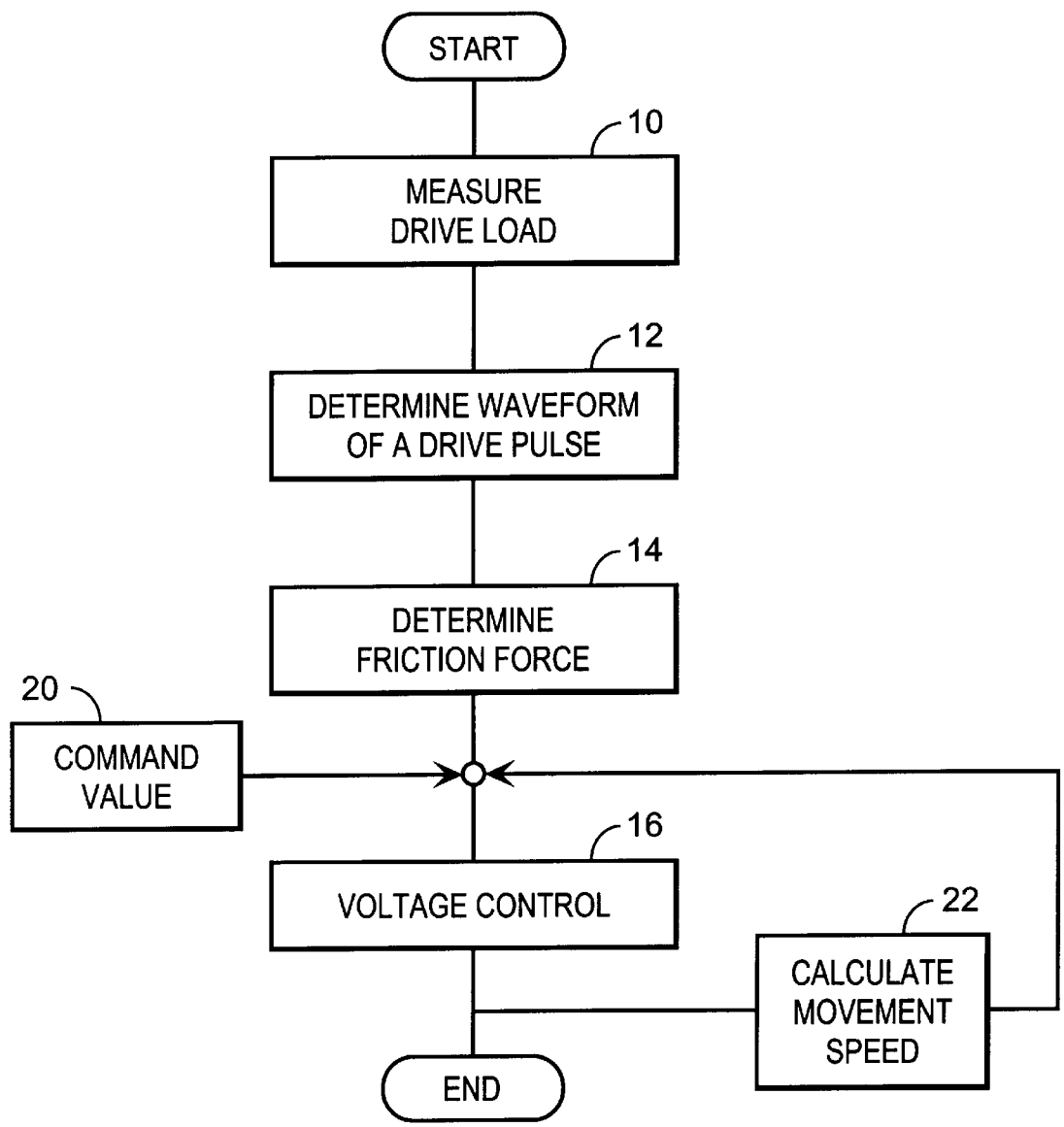
FIG. 12 is a flowchart showing the operation of the drive apparatus in accordance with the second embodiment of the present invention.

Next, a control flow for determining a drive pulse and a friction force on the basis of the drive load and drive speed will be described below referring to FIG. 12.

At step #10, a drive load is measured by using the output of the load sensor 16. Next, at step #12, a displacement pulse ratio T1/T3 (the ratio between the gradual drive time T1 and the abrupt drive time T3 with respect to the total time T2 of a displacement pulse; see FIG. 3B) is determined depending on the measured drive load, whereby the waveform of a drive pulse depending on the drive load is determined. It is herein assumed that data regarding the displacement pulse ratios T1/T3 depending on the measured drive load has been stored in the memory (not shown) of the drive control circuit 34 in advance. However, the data may be obtained by arithmetic operation. Since the ratio T1/T3 is a value (derived in consideration of G2) derived in consideration of the movement of the frictional coupling point between the drive unit 38 and the drive shaft 26, the drive control circuit 34 delivers a signal, by which the ratio of the movement of the frictional coupling point between the drive unit 38 and the drive shaft 26 is set to the determined ratio T1/T3, to the drive pulse generation circuit 32.

Next, at step #14, a friction force is determined depending on the measured drive load. In other words, the friction force is increased when the drive load is larger than a predetermined value.

Next, after the waveform of the drive pulse is selected, the movement speed of the drive unit 38 calculated on the basis of the output of the position sensor 14 at step #22 is compared in magnitude at step #16 with the input target speed (command value) shown at step #20. If the movement speed is lower than the target speed, the pulse voltage is raised just as the conventional example, and the height of the drive pulse waveform is adjusted on the basis of the determined drive pulse waveform, whereby a pulse voltage with higher speed and voltage is applied to the piezoelectric device 22. By carrying out control in this way, the target speed can be attained quickly.

The second embodiment is configured to control both the drive pulse and friction force. However, as shown in the block diagram in FIG. 11, the position sensor 14 may be omitted, and an open-loop control may be carried out by using only the load sensor 16. Furthermore, in the block diagram in FIG. 10 or FIG. 11, friction force control may be eliminated by omitting the piezoelectric device 31 and the pulse generation circuit 33 for friction drive.

Figure 13:
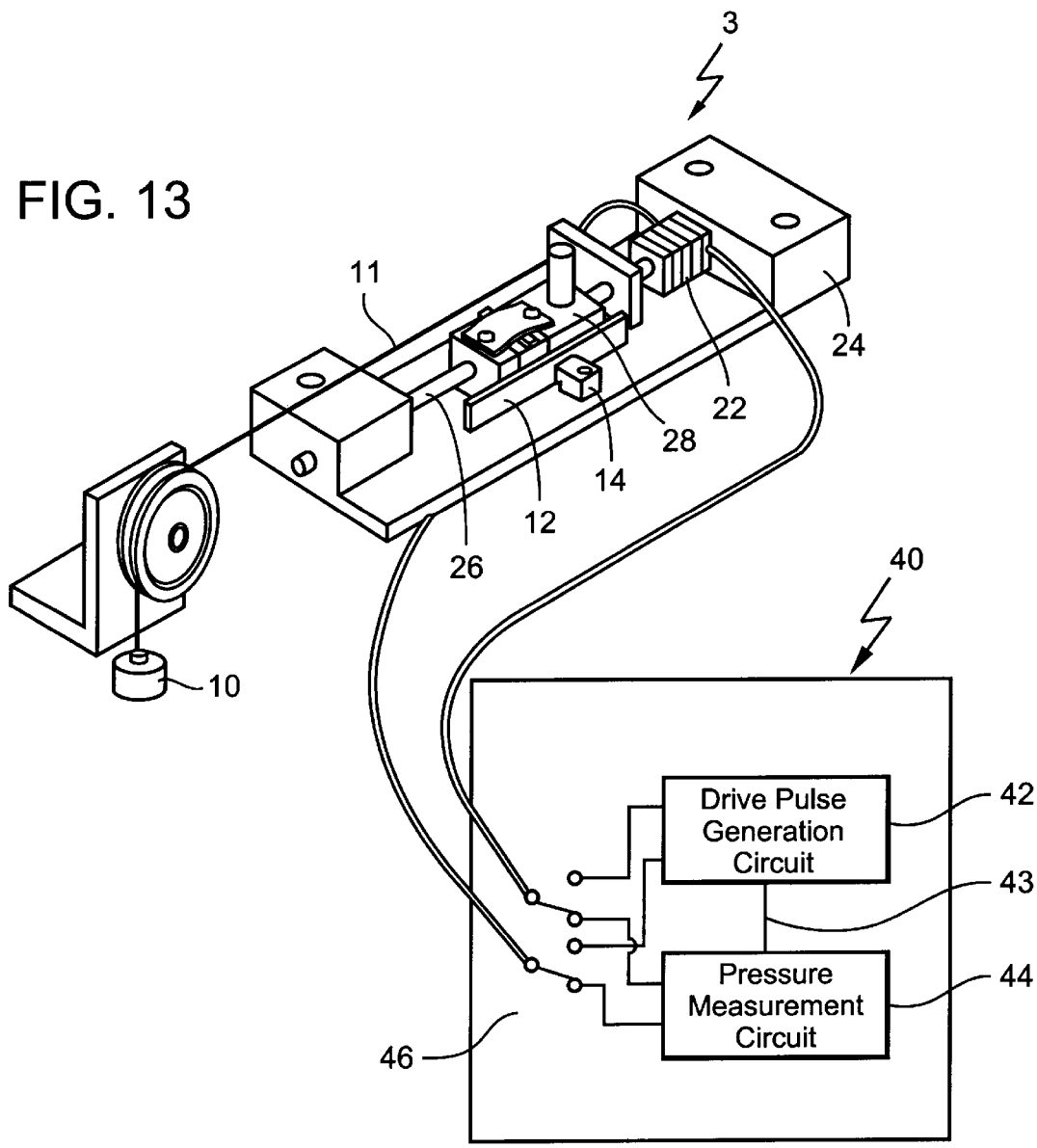
FIG. 13 is a perspective view showing a drive apparatus in accordance with a third embodiment of the present invention.

Next, a third embodiment will be described below referring to FIG. 13. The drive apparatus 3 of this embodiment is configured generally similar to the drive apparatus 1 of the first embodiment, except that no pressure sensor 16 is used and that a piezoelectric device 22 is also used as a load sensor.

In other words, in a stationary condition, when a drive load is applied to a drive unit 28, a pressure is applied to the piezoelectric device 22 via a drive shaft 26, and a voltage depending on the applied pressure is generated at the piezoelectric device 22. By detecting this voltage, the piezoelectric device 22 for drive use is also used as a load sensor. For this purpose, a control circuit 40 comprises a pressure measurement circuit 44 for detecting the pressure applied to the piezoelectric device 22 and a selection switch 46 connected to the voltage input/output terminals of the piezoelectric device 22 as well as a drive pulse generation circuit 42 for driving the piezoelectric device 22. With this selection switch 46, the piezoelectric device 22 can be selectively connected to the drive pulse generation circuit 42 or the pressure measurement circuit 44. The drive pulse generation circuit 42 and the pressure measurement circuit 44 are connected to each other via a data line 43 so that the drive pulse generation circuit 42 can be driven by feeding back the pressure measurement data. It is difficult to carry out pulse voltage generation and pressure detection simultaneously. However, with the selection switch 46, drive and pressure measurement can be carried out by measuring the pressure immediately before drive or by quickly selecting drive and pressure measurement, for example.

Since the drive apparatus 3 is not required to be provided with a load sensor separately, the mechanical configuration thereof can be simplified.

Figure 14:
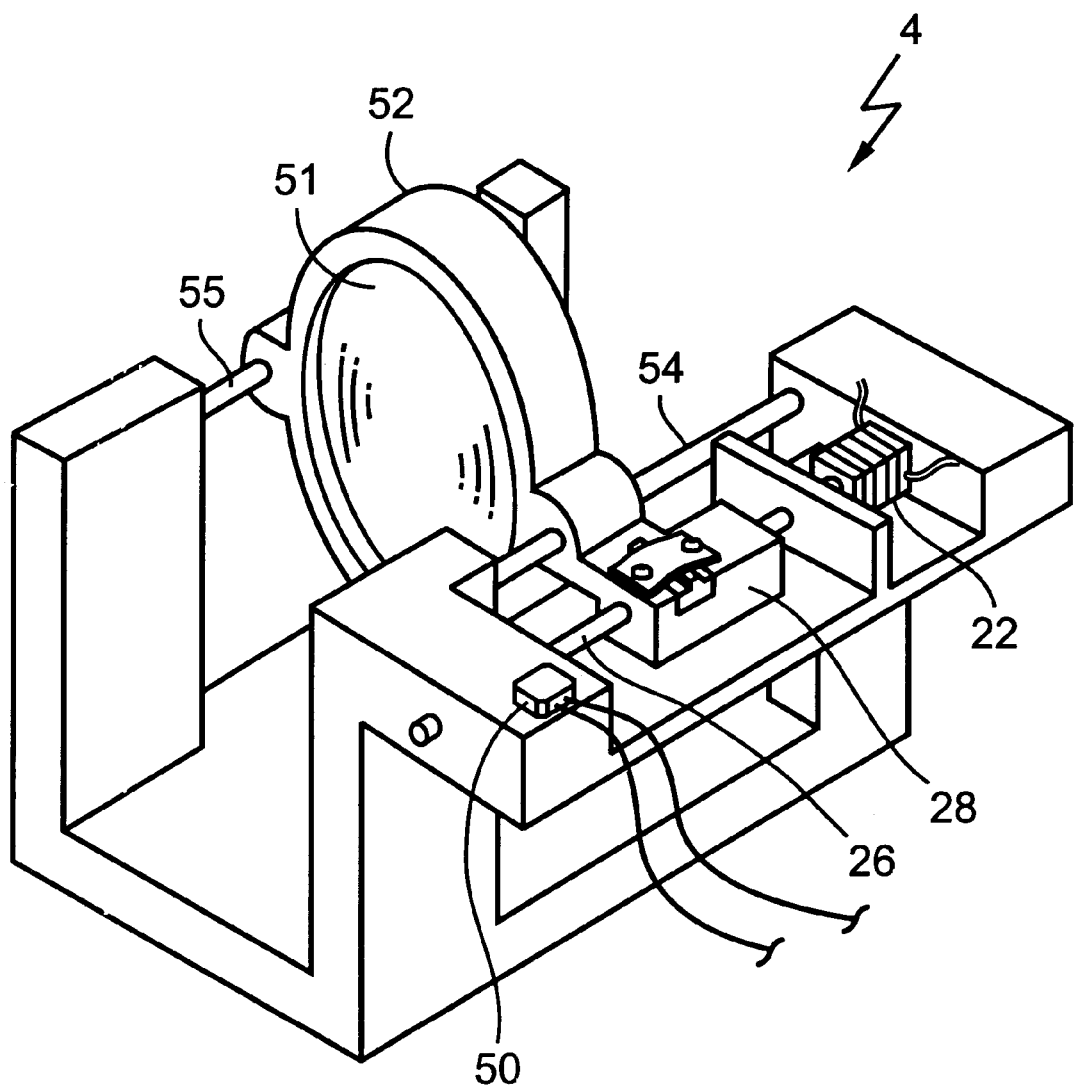
FIG. 14 is a perspective view showing a drive apparatus in accordance with a fourth embodiment of the present invention.

Next, a fourth embodiment will be described below referring to FIG. 14, a perspective view.

In the fourth embodiment, a drive apparatus 4 configured generally similar to the conventional drive apparatus 90 is used to drive a lens frame 52 for holding a lens 51. The lens frame 52 is guided by two guide bars 54 and 55 in the direction parallel with the drive shaft 26 of the drive apparatus 4, and connected to the drive unit 28 of the drive apparatus 4 so as to be moved together with the drive unit 28 as an integral unit.

Since the mass of driven object (the lens 51 and the lens frame 52) remains unchanged, the drive load of the drive apparatus 4 is determined by the angle of the drive shaft 26 of the drive apparatus 4 with respect to the ground. Therefore, an attitude-to-ground sensor 50 is used to obtain the angle of the drive shaft 26, and a component of the weight of the driven object in the direction parallel with the drive shaft 26 is calculated, whereby a drive load is measured and drive control is carried out. The attitude-to-ground sensor 50 can be mounted and adjusted more easily than other types of load sensors; furthermore, the mounting position thereof is less restricted and the circuitry thereof can be simplified. In this embodiment, since the lens frame 52 is driven while an image is observed, it is not necessary to measure the position of the drive unit 28. For this reason, no position sensor 14 is used.

Figure 15A:
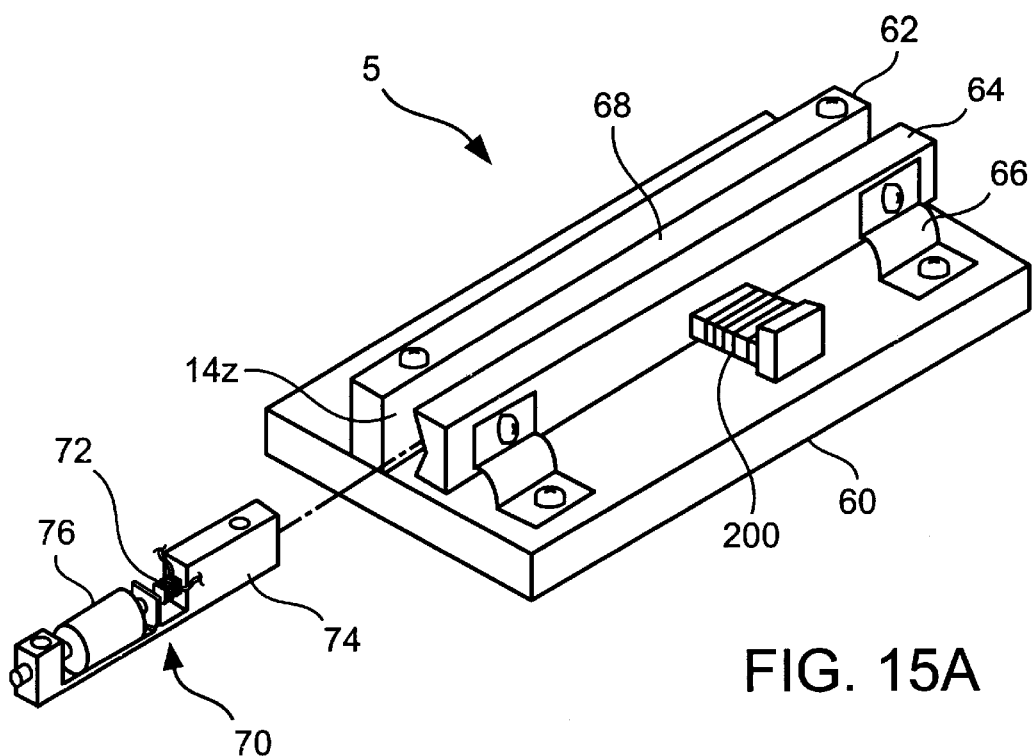
FIG. 15A is a perspective view showing a drive apparatus in accordance with a fifth embodiment of the present invention.
Figure 15B:
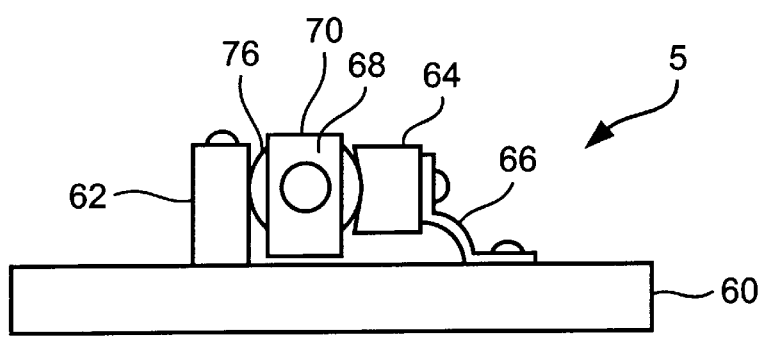
FIG. 15B is a plan view showing the drive apparatus in accordance with the fifth embodiment of the present invention.

Next, a drive apparatus 5 in accordance with a fifth embodiment will be described below in reference to FIG. 15A, a perspective view, and FIG. 15B, a front view.

This drive apparatus 5 differs in type from the drive apparatuses 1 to 4 in accordance with the above-mentioned first to fourth embodiments. In other words, in the drive apparatuses 1 to 4 in accordance with the above-mentioned first to fourth embodiments, the piezoelectric device 22 extends and contracts at its fixed position. In the case of the drive apparatus 5, however, a portion including a piezoelectric device 72 is moved as drive is carried out.

In other words, a stationary guide friction member 62 is secured to a base 60, and a movable guide friction member 64 is supported by support springs 66 in parallel with the stationary guide friction member 62. A drive unit 70 is disposed and held in the space 68 between the stationary guide friction member 62 and the movable guide friction member 64. The stationary guide friction member 62 and the movable guide friction member 64 correspond to a second friction member. A holding force generated therebetween, that is, a friction force, is changed depending on the extension/contraction of a piezoelectric device 200, one end of which in the extension/contraction direction thereof is securely connected to a support portion projecting on the base 60, and the other end of which in the extension/contraction direction thereof is securely connected to the mid-point position of the movable guide friction member 64.

The drive unit 70 is configured generally similar to the conventional drive apparatus 90, and comprises the piezoelectric device 72, a unit body 74 corresponding to the securing member 24 of the conventional apparatus 90, and a drive shaft 76 corresponding to the drive shaft 26 (first friction member) of the conventional apparatus 90. The ends of the piezoelectric device 72 in the extension/contraction direction thereof are securely connected to the unit body 74 and one end surface of the drive shaft 76, respectively. Both ends of the drive shaft 76 are supported by the unit body 74.

The central portion of the drive shaft 76 cylindrically projects beyond the outside of the unit body 74 so as to be frictionally coupled to the stationary guide friction member 62 and the movable guide friction member 64. A stage (not shown) or the like is contrived to be connected to the upper surface of the unit body 74. The mass of the unit body 74 is larger than that of the drive shaft 76.

Just as the above-mentioned third embodiment, the drive apparatus 5 uses the piezoelectric device 72 also as a load sensor, and is contrived to apply a pulse voltage having an optimal waveform corresponding to a drive load to the piezoelectric device 72. The drive apparatus 5 drives the drive unit 70 along the stationary guide friction member 62 and the movable guide friction member 64. In other words, when the piezoelectric device 72 is displaced gradually, the unit body 74 is moved by the friction force generated between the drive shaft 76 and the combination of the stationary guide friction member 62 and the movable guide friction member 64, while the drive shaft 76 remains stationary. On the other hand, when the piezoelectric device 72 is displaced abruptly in the opposite direction, the drive shaft 76 slides relatively with respect to the stationary guide friction member 62 and the movable guide friction member 64 and is moved in the displacement direction of the piezoelectric device 72, while the unit body 74 remains almost stationary because of the large inertia force of the unit body 74. As a result, the drive unit 70 is moved in one direction along the stationary guide friction member 62 and the movable guide friction member 64 as a whole.

In the drive apparatuses 1 to 5 in accordance with the above-mentioned embodiments, a drive load is detected and used for feedback control. Therefore, the drive apparatuses 1 to 5 can carry out drive control depending on the drive load more appropriately than the conventional drive apparatus 90.

What is claimed is:

1. A drive apparatus, comprising:
    a drive pulse generation device for generating drive pulses;
    an electromechanical transducer having a first end and a second end, the electromechanical transducer expanding and contracting in response to pulses supplied from the drive pulse generation device;
    a support member secured to the first end of the electromechanical transducer in the expansion/contraction direction thereof;
    a first friction member secured to the second end of the electromechanical transducer in the extension/contraction direction thereof;
    a second friction member frictionally coupled to the first friction member;
    a load detection device for detecting a magnitude of a load on the second friction member; and
    a drive control device for carrying out drive control of the electromechanical transducer on the basis of the detection results of the load detection device.

2. The drive apparatus according to claim 1, the drive control device including a gradual/abrupt displacement generation device for causing the electromechanical transducer to expand and contract in response to pulses supplied from the drive pulse generation device such that a gradual displacement between the support member and the second friction member in a single drive period is generated and such that an abrupt displacement between the support member and the second friction member in the single drive period is generated.

3. The drive apparatus according to claim 1, the electromechanical transducer including a piezoelectric device.

4. The drive apparatus according to claim 1, further comprising an attitude sensor, the load detection device for detecting the magnitude of the load based on an attitude sensed by the attitude sensor.

5. The drive apparatus according to claim 4, the gradual/abrupt displacement generation device for changing a ratio between a time during which the gradual displacement is performed and a time during which the abrupt displacement is performed in the single drive period.

6. The drive apparatus according to claim 5, the gradual/abrupt displacement generation device for increasing the ratio as the magnitude of the drive load detected by the load detection device increases.

7. The drive apparatus according to claim 4, the single drive period corresponding to the period of a single drive pulse to be output from the drive pulse generation device.

8. The drive apparatus according to claim 4, a single drive pulse to be output from the drive pulse generation device including a first waveform and a second waveform, the first waveform for generating the gradual displacement between the between the support member and the second friction member in a period of the single drive pulse, the second waveform for generating the abrupt displacement between the support member and the second friction member in the period of the single drive pulse.

9. The drive apparatus according to claim 8, the gradual/abrupt displacement generation device for changing a ratio between a duration of the first waveform and a duration of the second waveform in the period of the single drive pulse to change a ratio between a duration of the gradual displacement and a duration of the abrupt displacement.

10. The drive apparatus according to claim 9, the gradual/abrupt displacement generation device for increasing the ratio between the duration of the first waveform and the duration of the second waveform in the period of the single drive pulse as the magnitude of the load detected by the load detection device increases.

11. The drive apparatus according to claim 1, further comprising a friction force changing device for changing the friction force generated between the first friction member and the second friction member.

12. The drive apparatus according to claim 11, the friction force changing device increasing the friction force generated between the first friction member and the second friction member as the load detected by the load detection device increases.

13. The drive apparatus according to claim 1, the electromechanical transducer being a piezoelectric device, the load detection device including the piezoelectric device, the piezoelectric device for detecting the magnitude of the load.

14. A drive apparatus, comprising:
    a movable member;
    a drive pulse generation device for generating drive pulses;
    an electromechanical transducer, the electromechanical transducer being expandable and contractible in response to the pulses supplied to the electromechanical transducer from the drive pulse generation device, the electromechanical transducer being connected to the movable member so as to cause the movable member to be driven when the electromechanical transducer expands and contracts; and
    a load detection device for detecting a magnitude of a load on the movable member, the drive pulse generation device for generating pulses on the basis of the detection results of the load detection device.

15. The drive apparatus according to claim 14, further comprising an attitude sensor, the load detection device for detecting the magnitude of the load on the movable member based on an attitude sensed by the attitude sensor.

16. The drive apparatus according to claim 14, the electromechanical transducer being connected to the movable member such that the movable member moves relative to the electromechanical transducer when the electromechanical transducer repeatedly expands and contracts.

17. The drive apparatus according to claim 16, the electromechanical transducer being connected to the movable member with a drive shaft, the drive shaft being fixed to one end of the electromechanical transducer, the drive shaft being frictionally coupled to the movable member.

18. The drive apparatus according to claim 14, the electromechanical transducer being connected to the movable member such that the movable member and the electromechanical transducer move together when the electromechanical transducer repeatedly expands and contracts.

19. The drive apparatus according to claim 18, further comprising a guide member, the electromechanical transducer being connected to the movable member with a drive shaft, the drive shaft being fixed to one end of the electromechanical transducer, the drive shaft being frictionally coupled to guide member.

20. The drive apparatus according to claim 19, the drive pulses having a first waveform for causing the electromechanical transducer to expand and having a second waveform for causing the electromechanical transducer to contract, the drive pulse generation device for generating drive pulses on the basis of the detection results of the load detection device by increasing a duration of the first waveform relative to a duration of the second waveform when the load detection device detects an increase in the magnitude of the load on the movable member.

21. The drive apparatus according to claim 19, the drive pulses having a first waveform for causing the electromechanical transducer to expand and having a second waveform for causing the electromechanical transducer to contract, the drive pulse generation device for generating drive pulses on the basis of the detection results of the load detection device by decreasing a duration of the first waveform relative to a duration of the second waveform when the load detection device detects a decrease in the magnitude of the load on the movable member.

22. The drive apparatus according to claim 14, further comprising a friction force changing device for changing a friction force between the movable member and another member as the load detected by the load detection device changes.

23. The drive apparatus according to claim 22, the another member being a drive shaft.

24. The drive apparatus according to claim 22, the another member being a guide member having a groove that receives the movable member.

25. The drive apparatus according to claim 14, the electromechanical transducer being a piezoelectric device, the load detection device including the piezoelectric device, the piezoelectric device for detecting the magnitude of the load on the movable member.

26. Method of driving a movable member, comprising:
   detecting a change in a magnitude of a load on a movable member; and
   driving the movable member by repeatedly expanding an contracting an electromechanical transducer;
   changing a duration of at least one of the expansion and the contraction of the electromechanical transducer based on the detected change in the magnitude of the load on the movable member.

27. The method according to claim 26, wherein the electromechanical transducer is repeatedly expanded and contracted by supplying drive pulses to the electromechanical transducer.

28. The method according to claim 27, wherein the movable member is driven based on the detected change in the magnitude of the load on the movable member by varying at least one of a duration of a first waveform of the drive pulses that causes the electromechanical transducer to expand and a duration of a second waveform of the drive pulses that causes the electromechanical transducer to contract.

* * * * *